(12) United States Patent
Devaraj et al.

(10) Patent No.: US 11,750,883 B2
(45) Date of Patent: Sep. 5, 2023

(54) SYSTEM AND METHOD FOR USING PERSONAL COMPUTING DEVICES TO DETERMINE USER ENGAGEMENT WHILE VIEWING AN AUDIO/VIDEO PROGRAM

(71) Applicant: Sling Media PVT Ltd, Bengaluru Karnataka (IN)

(72) Inventors: Vivek Devaraj, Bangalore (IN); Chitra Siddalinga Murthy, Bangalore (IN)

(73) Assignee: DISH NETWORK TECHNOLOGIES INDIA PRIVATE LIMITED, Karnataka (IN)

( * ) Notice: Subject to any disclaimer, the term of this patent is extended or adjusted under 35 U.S.C. 154(b) by 201 days.

(21) Appl. No.: 17/213,788

(22) Filed: Mar. 26, 2021

(65) Prior Publication Data

US 2022/0312071 A1 Sep. 29, 2022

(51) Int. Cl.
*H04N 21/41* (2011.01)
*H04N 21/442* (2011.01)
*H04N 21/422* (2011.01)

(52) U.S. Cl.
CPC ........... *H04N 21/44218* (2013.01); *H04N 21/4126* (2013.01); *H04N 21/42201* (2013.01)

(58) Field of Classification Search
None
See application file for complete search history.

(56) References Cited

U.S. PATENT DOCUMENTS

| | | | |
|---|---|---|---|
| 7,395,546 B1* | 7/2008 | Asmussen | H04N 21/4333 379/142.05 |
| 10,171,877 B1 | 1/2019 | Shah et al. | |
| 10,820,060 B1* | 10/2020 | Bosworth | G06V 40/20 |
| 2008/0134278 A1* | 6/2008 | Al-Karmi | H04L 12/2834 455/556.1 |
| 2008/0221400 A1* | 9/2008 | Lee | A61B 5/369 600/301 |
| 2010/0004977 A1* | 1/2010 | Marci | H04N 21/44218 705/7.32 |
| 2010/0211439 A1* | 8/2010 | Marci | H04N 21/252 705/7.29 |
| 2012/0324491 A1* | 12/2012 | Bathiche | H04N 21/42201 725/10 |
| 2014/0068692 A1* | 3/2014 | Archibong | H04N 21/6334 725/116 |

(Continued)

OTHER PUBLICATIONS

J. Hernandez, et al., "Measuring the engagement level of TV viewers," *2013 10th IEEE International Conference and Workshops on Automatic Face and Gesture Recognition* (FG), Shanghai, China, 2013, pp. 1-19.

*Primary Examiner* — William J Kim
(74) *Attorney, Agent, or Firm* — Seed IP Law Group LLP

(57) ABSTRACT

According to principles of the disclosure, the level of engagement by a user in watching a program is determined based on data received from a personal computing device that is coupled to the user while they are viewing the audio/video program as it is displayed. The personal computing device contains a number of user biological function sensors which are able to measure and receive one or more biological functions that are personal to the user while they view the audio/video program. The changes in a particular biological function, such as heart rate, breathing, movement and other activities are compared to the type of content in the program being viewed and a correlation carried out in order to determine the level of engagement of the user has with the program.

17 Claims, 8 Drawing Sheets

(56) References Cited

U.S. PATENT DOCUMENTS

| | | | | |
|---|---|---|---|---|
| 2014/0282646 | A1* | 9/2014 | McCoy | H04N 21/44213 |
| | | | | 725/12 |
| 2015/0189378 | A1* | 7/2015 | Soundararajan | H04N 21/4524 |
| | | | | 725/12 |
| 2015/0199975 | A1* | 7/2015 | Won | H04N 21/8547 |
| | | | | 704/207 |
| 2015/0319168 | A1* | 11/2015 | McCarty | H04L 63/102 |
| | | | | 713/186 |
| 2016/0345060 | A1* | 11/2016 | Marci | A61B 5/165 |
| 2016/0381415 | A1* | 12/2016 | Vijay | H04N 21/4415 |
| | | | | 725/12 |
| 2017/0055017 | A1* | 2/2017 | Christie | H04N 21/44218 |
| 2017/0055033 | A1* | 2/2017 | Christie | H04N 21/47202 |
| 2017/0085951 | A1* | 3/2017 | Singh | H04N 21/47217 |
| 2018/0103080 | A1* | 4/2018 | Girish | H04L 65/80 |
| 2018/0255335 | A1* | 9/2018 | George | H04N 21/4532 |
| 2019/0014378 | A1 | 1/2019 | Shah et al. | |
| 2019/0052926 | A1* | 2/2019 | Waterman | H04N 21/8455 |
| 2019/0200085 | A1* | 6/2019 | Merced | A61B 5/02438 |
| 2019/0305978 | A1* | 10/2019 | Ramirez | H04N 21/4821 |
| 2019/0306671 | A1* | 10/2019 | Rivkin | H04N 21/4882 |
| 2021/0314653 | A1* | 10/2021 | Golyshko | H04N 21/2387 |

* cited by examiner

SYSTEM AND METHOD FOR USING PERSONAL COMPUTING DEVICES TO DETERMINE USER ENGAGEMENT WHILE VIEWING AN AUDIO/VIDEO PROGRAM

BACKGROUND

Technical Field

This disclosure is in the general field of determining the viewer engagement in watching an audio/video program and, in particular, using personal smart devices, such as a smartwatch and a smartphone to sense the viewer's engagement while watching and audio/video program.

Description of the Related Art

When an audio/video program is playing on a display, the viewer may be engaged in watching the program at different interest levels. For example, the viewer might be intensely engaged in watching the program, carefully following the audio/video program, and even participating in the action taking place on the screen. Alternatively, the viewer might be casually involved in the program, watching it from time to time, but participating in some other activities. As yet a further alternative, while the program is being played the viewer might be distracted or doing other activities entirely instead of watching the program. It is desirable to determine how engaged the viewer is in the audio/video program.

BRIEF SUMMARY

According to principles of the disclosure, the level of engagement by a user is measured using a personal computing device that is coupled to the user while they are viewing the audio/video program as it plays. The personal computing device also contains a number of biological function sensors of the user which are able to measure and receive one or more biological functions that are personal to the user while they view the audio/video program. The biological functions may include such functions as heart rate; movement of one or more appendages, whether an arm, a leg, or head; drastic changes in heart rate; movement of the physical location of the user; accelerations undergone by the user, such as jumping, twisting, pacing, jerking, and turning quickly, or other physical movements. The personal computing device will immediately transmit the sensed biological function to the set top box that is driving the display of the audio/video program. The set top box will then match the changes in the biological functions of the user with the content of the audio/video program that is being displayed to the user during the same timeframe. This comparing of the type of content of the audio/video program to changes in the biological function of the user during this same timeframe occurs within the set top box that is controlling the display of the audio/video program. The audio/video program has access to the metadata that provides the current content of the audio/video program that is being displayed to the user during the same first timeframe. The set top box will, therefore, determine a level of correlation between the type of content in the audio/video program and changes in the biological function of the user for that time period. It thereafter outputs a signal providing an indication of the level of user engagement with the audio/video program content based on the results of the level of correlation of the type of content in the audio/video program and the types of changes in the biological function of the user for that same time period.

According to one embodiment, the connected system of devices may include a smart TV, a display driven by a set top box, a smartphone, a smartwatch, smart home appliances, or other device. These include devices that are personal to the user. In addition, these devices are coupled to the user while viewing the program. For example, a smartwatch is typically on the wrist of the user, a smartphone is held in the hand of the user or, in some instances, placed in a pocket of the user. The smart device, whether held in the hand or placed in a pocket of clothes the user is wearing, is coupled to the user and is, therefore, able to sense biological functions of the user.

The biological functions which the smart device is able to measure and store may include heart rate, breathing rate, changes in oxygen saturation level, movement of a particular appendage, such as an arm or a leg, accelerations of the body of the user such as jumping, pacing, sudden twisting, or other activity. In addition, the smart device will have a microphone and is able to receive verbal utterances from the user, whether a gasp, an exclamation, or a particular word which it can recognize and interpret to understand the content of the utterance.

In some embodiments, the smart device will also be coupled to smart functions of the home of the user. For example, the smartphone and/or the smartwatch will also receive telephone calls directed to the user. The smart device will, therefore, be able to correlate input from the smart device, such as a telephone call or a message with the changes in the body function of the user. If the changes in the body function of the user are occurring based on input from the smart device, such as a phone call or text message, then the system will be able to discount such changes as being based on other external activity and not based on changes in the content of the audio/video program.

According to one embodiment, the system receives a reference measurement value of the biological function of the user in a reference timeframe. The reference timeframe may be at the start of the audio/video program, just prior it starting, after watching it, or while the user is at rest in a different part of the home or a different day and not watching the video display. This reference measurement is saved in the system as a baseline measurement of the biological functions of the user. The audio/video program is then displayed to the user and changes in the biological function of the user are collected continuously and simultaneously with the display of the audio/video program to the user. Concurrently with the biological function data being collected from the user, they are transmitted immediately to the set top box that is controlling the display of the audio/video program. This biological function data is received by the system and compared to the reference measurement of the same biological function. For example, the resting heart rate of the user can be compared to the current heart rate of the user during a particular type of scene in the audio/video program, such as a scary scene, a high-intensity car chase, or other activity occurring in the audio/video program. This reference biological function data may also be taken from the time period which is immediately prior to the change in the type of content in the audio/video program. For example, the reference data may be collected while the audio/video program is at a low intensity time period the actors on the screen waiting or exiting a building. Then at a sudden point in time, a high-speed action may take place, such as a car chase, a car wreck, or other sudden change in the program content, resulting in a change in the biological function of the user from the low intensity video display to the sudden very high intensity program content. Thus, the reference measurement data can be from a resting time period before the audio/video program was displayed, or from a time period that is just immediately prior to the first time period during which the biological function is being sensed. By measuring the level of correlation between the type of content in the audio/video program and changes in the biological function of the user from the reference time period to the first time period the amount of engagement of the user with the content of the audio/video program can be determined.

DETAILED DESCRIPTION

Figure 1A:
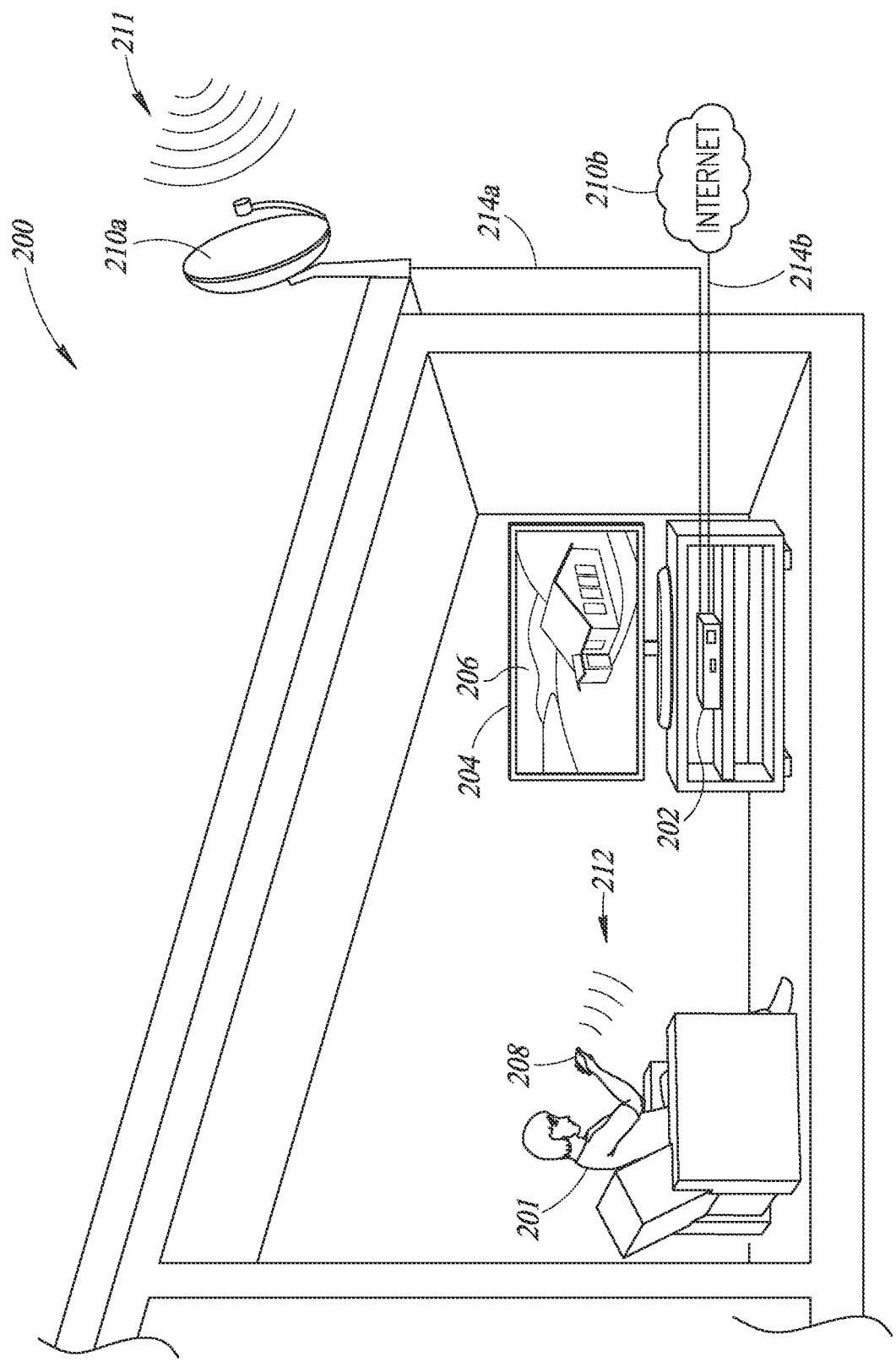
FIG. 1A shows a user viewing an audio/video program while biological functions are being sensed.

FIG. 1A illustrates a system 200 for determining the engagement of a viewer as they watch an audio/video program. A user 201 viewing an audio/video program 206 on a video display 204. The audio/video program is provided to the display 204 by a set top box 202 or other acceptable receiver and driver system. The source of the audio/video program 206 into the set top box 202 is from an audio/video supply 214, which may be the Internet 210b, a satellite dish 210a, or other source. The program can be referred to as an audio/video program, an audio video program, an A/V program, or similar nomenclature. In the circumstance of using the satellite dish 210a, the signal 211 may be received via a satellite and then delivered from the satellite dish 210a along line 214a into the set top box 202 to provide the video display 204.

While the user 201 is viewing the audio/video program 206 they may be holding a personal computing device 208, such as a smartphone, a tablet, a smartwatch, or other personal computing device that is personally associated with or coupled to the particular user that is viewing the audio/video program.

The personal computing device 208 is personally associated with a particular user 201 by one or more associated couplings. The personal computing device 208 will have stored therein the identity of the user, and frequently will also include email accounts, social media accounts such as Twitter, Facebook, and other accounts which are personal to the user which provide an identity of the user. The personal computing device will also likely have as user recognition device, such as a fingerprint sensor, a face recognition sensor, an iris sensor, or some other sensor which is personal to the user so that it is accurately known and stored within the personal computing device 208 the identity of the particular user who is accessing the personal computing device. In addition, the personal computing device will be associated with a number of other computing devices, social media accounts, smart devices, and applications stored either locally or in the cloud that are associated with a particular user 201. For example, it may be associated with the user via a common Google account which may include the set top box 202, other smart TV, smartphone, smartwatch, or personal computing device. It may also be coupled to a common system, such as a common Android system, which may be an Android phone, an Android TV, an Android watch, or other system which has a single Google account that is associated with a particular user. The personal computing device 208 will include a number of sensors for sensing movement of itself or biological function data of the user 201. Many personal computing devices which are carried by a user frequently contain a number of sensing devices. These sensing devices may include motion sensors, accelerometer sensors, heart rate sensors, pulse oximeters for checking the blood oxygen levels, breathing rate sensors, or different kinds of movement sensors. In particular, many personal computing devices also carry out the function of being exercise tracking devices which track the number of steps, heartbeats, exercise routines, or other physical activities carried out by the user. In addition, many personal computing devices contain sensors for sensing particular features about a user. For example, they may be able to recognize a particular user's face to distinguish the face of the user who owns the personal device as compared to the face of a non-user. Along with sensing the identity of the face of the user, such personal computing devices also sense certain features about the user, for example, the eye iris pattern of the user, the dilation of the eyes, the amount of blink in the eyes, the breathing of the user, as well as other features about the user which may include temperature sensing of the user's body temperature, chills experienced by the user, minor movements such as jerking of a hand, an arm, or other features about the physical motion of the user. It may also include a software for recognizing and analyzing different expressions on the user's face.

When a user begins to view an audio/video program, their level of engagement may vary depending upon a number of factors. These factors might include their interest in the program, interruptions which may occur, other programs which overlap and cause the user to switch to a different program, or different programs on different devices. In some instances in the prior art, measuring the user's engagement with an audio/video program is straight forward. If the user watches the audio/video program for a very short period of time and then changes the station and never comes back to that audio/video program, then it can be noted that the user had no interest in that particular audio/video program. By sensing when the display of the program has been terminated, it can be determined that the user's interest in that particular program was very low and has now concluded. This prior art method is not useful to determine user engagement if the program runs for its entire length.

However, in those instances in which the audio/video program runs completely from the start to the finish, or from starting point in time until it is concluded, it can be more difficult to tell whether the user was actually engaged watching the program while it was being displayed, and if so, how engaged the user was in that particular program.

In order to measure a level of engagement of the user with the actual content of the program being displayed, the present disclosure takes advantage of having one or more personal computing devices coupled to the user as they are watching the program.

As previously noted, many personal computing devices contain a number of sensors in order to sense and record biological data of a user. For example, many smartphones include physical exercise tracking devices. In addition, smartwatches or exercise personal computing devices may include heart monitors, pulse oximeters, and temperature sensors, as well as a number of other biological sensors in order to determine the physical health parameters of a particular owner of that personal computing device.

The set top box 202 has the metadata of the program which is being displayed. In the metadata will be an indication whether the movie being displayed is a romance, a comedy, a horror film, or other genre. In addition, based on metadata which is available to the set top box or other review of the program as it is being displayed, the set top box 202 has stored in its memory metadata indicating the location in the program where particular scary scenes in a particular horror movie may occur. If the user is watching this particular horror movie, the smart device coupled to the user will track the user's heart rate for the duration of the movie.

The biological data sensed, such as heart rate, will be transmitted via signal 212 concurrently with the video being watched to the set top box 202. The signal 212 can be transmitted by any acceptable technique or signal type, for example, via WiFi, Bluetooth, NFC, Infrared, ultrasound, RFID or any other type of reasonable way to communicate data from a personal computing device to the set top box 202. The set top box will be provided with the appropriate transceiver system, including antenna, to be able to send and receive signals to and from the personal computing device. For example, when the personal computing device is first recognized by the set top box, they can exchange data signals with each other to confirm they are in communication and the set top box can request certain data from the personal computing device 208, such as the user's identification, which programs the user has running on that particular personal computing device, and other data. The set top box 202 will match the user's biological data, for example the heart rate, with the scenes being shown on the movie. If the user's heart rate rapidly jumps indicating the user was scared during a particular scary scene in the move, then this will indicate that the user is highly engaged in the movie. Similarly, if a romantic scene occurs the biological sensing device may sense deep breathing, or in some instances shallow, rapid breathing, corresponding to particular romantic scenes in the movie. This may also be accompanied by a significant increase in heart rate. All these changes in the biology of the viewer would be an indication that the user was engaged in the movie and, during the most romantic scenes, was very attentive to the movie.

The user engagement can also be measured based on the user's operation of the set top box 202 during particular scenes combined with their biological functions. For example, if a very scary scene is about to occur, or has just occurred, and the heart tracking device indicates that the user heart has skipped a beat or has a dramatically increased heartbeat, then at that same time, the user pauses the program and the skips over this scene, it can be estimated that the scene was skipped because it was too scary and not because the user was not engaged in the movie. Indeed, the sequence of a rapid change in a biological function, such as heart rate, blood pressure, or breathing patterns, followed by a pause in the movie and then skipping ahead is an indication of intense user engagement during the program.

If tracking of the viewing is done without the biological sensor, it might be estimated that the skipping of the scene or the pausing was done because the user was not engaged and not interested in the program. However, when the biological data from the user is matched with the time of a particular scene, a pause, or a stop, and it is shown that heart rate and breathing rate of the user is tracking the scenes being shown in the movie, then the conclusion can be drawn that the user is highly engaged in the movie and, accordingly, instead of being determined the user 201 was not interested, the interest rate can be marked as extremely high, or so intense that the user had to stop viewing.

The system can therefore stop the output of the audio/video program data from the set top box to the display if the level of the user engagement is above a threshold level. It can also stop the output of the audio/video program data from the set top box to the display if the level of the user engagement is below a threshold level.

As another example, if the user is watching an action movie or suspenseful thriller, the user's activity can be tracked for the entire duration of the movie using a connected smart device, such as a smartwatch, smartphone, or other personal computing device coupled to the user. If the user is pacing around, anxious, jumping or cheering while watching, then these actions can be matched to scenes shown in the program at the time that certain activities occur. For example, if the user jumps quickly to the ground when a team scores a touchdown in a football game the user is watching, then this can be recorded as the user having a very high engagement with that particular program. This type of sensing could be applied to all programs, such as live TV programs, such as football and basketball. It can also be applied to movies from romantic to scary movies, to comedy, to drama, action thrillers, and all other types of movies.

Figure 1B:
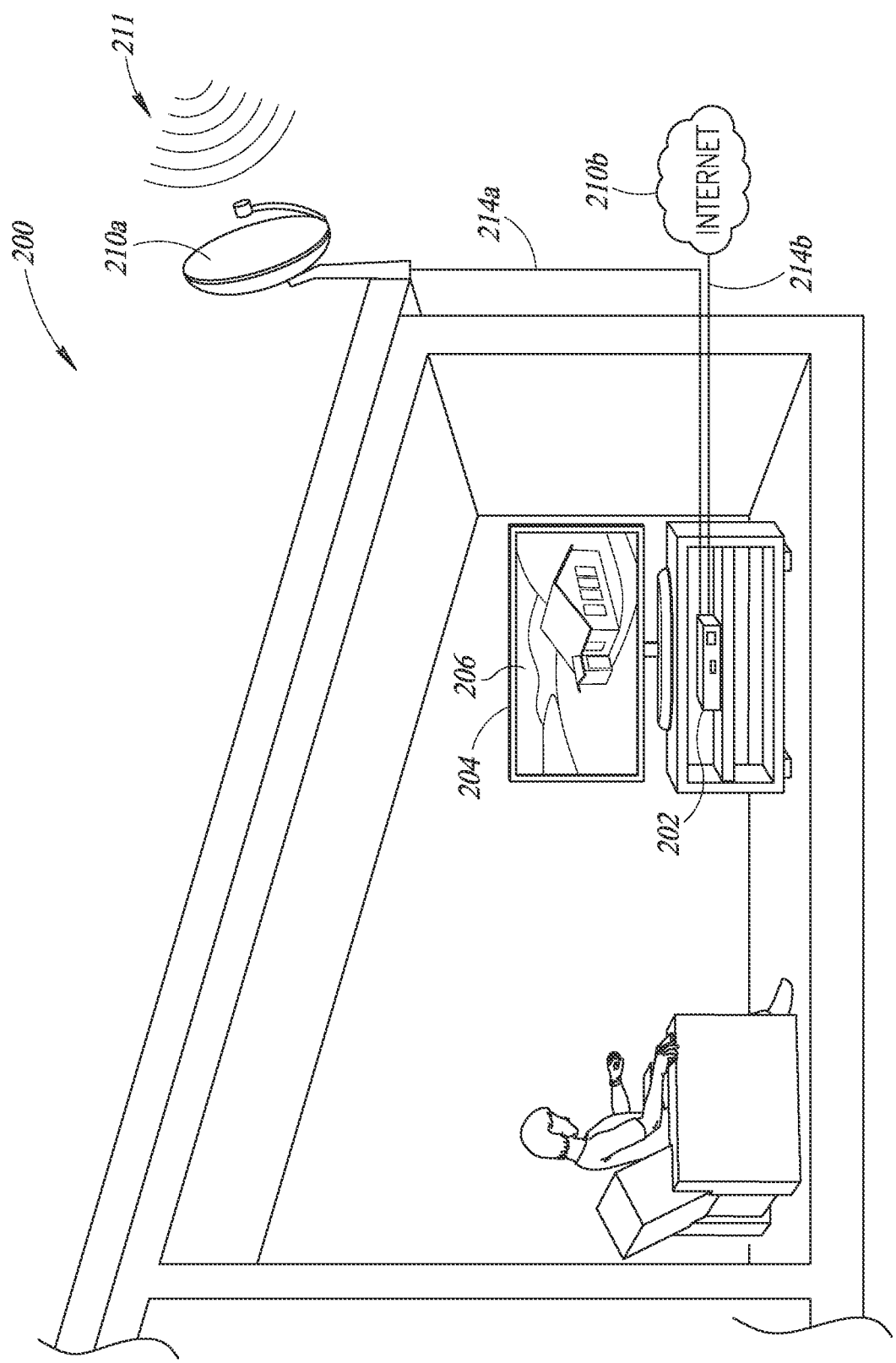
FIG. 1B shows a user viewing an audio/video program while a different sensing device is sensing biological functions of the user.

FIG. 1B provides an indication of different types of user activity which can be used to determine the engagement of the user with the program 206 being shown on the display 204. In this instance, the user 201 has on their wrist 203 personal computing device 208 in the form of a smartwatch 209b. The smartwatch might receive messages, phone calls, texts, or other data incoming. These can be considered interruptions to the user watching the program. Because the smart device is interacting with and downloading data to the set top box 202 via signal 212 at all times, the set top box is provided a record of, and stores, whenever notifications of any type, whether calls, messages, texts, or the like, are received at the personal computing device, in this instance the smartwatch 209b. If a text is received on the smartwatch 209b and at the moment it is received, the user 201 glances at the smartwatch, but in fact does not pause the movie, and moves the smartwatch back to a position where it is not being viewed by the user and instead turns their position to the program, it can be determined that the user has a very high engagement with the program being shown on the display 204. Specifically, the sensors in the smartwatch 209b will indicate that a text has been received and that the user has briefly moved their wrist to a viewing position, as some sensors will indicate based on accelerometers and position sensors, that the user has positioned the smartwatch 209b so that they can look at the text. The amount of time that the smartwatch 209b is in a position to be viewed by the user can be sensed and the data of that time transmitted to the set top box 202. If the watch is in the viewing position for only a brief period of time, such as less than a second of time, or for a brief glance, and then is returned to the resting position where it cannot be viewed by the user, then this is an indication that the user has a very high interest in the program 206. Thus, even though the user's heart rate did not change, the biological function of briefly moving the wrist for a glance and then returning the wrist to where the message cannot be viewed and not reading the message indicates that the user has a greater interest in the program than reading the message. Thus, an indication that the user did not read or answer the message indicates a high level of engagement with the program.

Alternatively, if the user looks for a longer time at the computing device, whether smartwatch or smartphone, sufficient to read the text message, then this will indicate that the text message has more interest to the user than the program. Depending on the level of sophistication of the smartwatch 209b, it may know the identity of the person who sent the notification, such as a spouse, a good friend, or a child. If the user reads in full messages from a spouse, but glances and ignores messages from a friend, then this would indicate that the user's interest is still quite high in the program, even though they selectively read some messages, but did not read all of them. Further along these lines, the personal computing device 208 will also know whether or not the user replied to the notification which they received. For example, if the user took the time to, not only read the notification, but answer the notification with a reply while the program 206 was playing, this will indicate that the user has lost engagement with the program and has temporarily stopped watching. The data that corresponds to the timing of when the user received the message, looked at the message, and replied to the message will be transmitted by signal 212 from the personal computing device 208 to the set top box 202 in order to make a determination of the engagement of the user with the particular program being shown.

The system can therefore sense that a notification has been received by the user at their personal computing device and then can determine a level at which the user interacts with the notification received at their personal computing device. The level can be zero, meaning fully ignores the notification and continues watching the program; slight, such as a glance at the notification and returns to watch the program; medium, which might include some reading of, but not responding to the notification; moderate, which would be significant study and/or full reading of the notification; or high, which would include taking an action based on the notification, such as leaving the room, responding to or forwarding the notification. The level of response to the notification can also be measured in different ways, such as a numerical value from 0 to 10, as another example.

The value of the level of user engagement can be changed based on the level at which the user interacts with the notification received at their personal computing device.

According to one embodiment, if the user has shown a high level of engagement in the program for a substantial portion of the program and then receives a notification, and takes the time to read and, in some instances, answer the notification, the set top box 202 can automatically pause the program 206 during such activity. In those instances in which the user engagement has been measured as extremely high for the first part of the program, it can be determined that the user had a very high interest in the program and wishes to see the entire program. However, when a notification arrives, such as from a spouse which might be quite important, the user's taking the time to read and reply to the notification is an indication of an unexpected interruption and not a lack of interest in the program 206. In such an instance, the set top box 202 can compare the current engagement with the program and make a determination that it is preferred to pause the movie at the time the interruption occurred. Thus, it is possible to improve the user experience by providing the ability to automatically pause the move at the time the notification was received and, if the user has taken the time to respond to the notification, before the pause occurs, the program can be automatically rewound for a few seconds until it reaches the point in time in which the notification first arrived. Then, after the user has replied to the notification and put the personal computing device back in the non-viewing position, such as by moving their wrist 203 back to the couch, the program 206 can then start again exactly at the place where the notification was first received. This pause and replay could be carried out automatically, thus interruptions that occur will be automatically accommodated for and it will not be necessary for the user to retrieve the remote control in order to back the movie up or pause the movie. The user experience is, therefore, enhanced because the set top box 202 will be storing a determination of the user's engagement at all times and in the event of a high user engagement that has interruption, it will pause the movie so that the user does not miss any part of the action in a movie in which they are highly engaged.

The system can therefore stop the output of audio/video program data from the set top box to the display if the level of the user engagement is above a threshold level. This can occur based on the engagement itself being measured at the threshold level of an external event happening to distract the viewer if the level of engagement is above a different, second threshold, that might be higher or lower than the first threshold. It can also stop the output of the audio/video program data from the set top box to a display if the level of the user engagement is below a threshold level.

Another mode of operation that can be carried out, if desired, is that the set top box can send to the personal computing device a request to collect certain types of data regarding the personal computing device itself, as well as specific data about the user's profile, age, gender, social media usage, and different types of biological data from the user. As examples, the set top box can send a query to the personal computing device asking for its hardware and software versions, how long it has been in use, what types of biological data it has already collected, and the types of biological data it is able to collect. It can obtain a download of any biological data, medical reports, doctor's exercise recommendations, and the like that have already been collected in prior weeks and months from this particular user, including actual past exercise data.

It can collect, for one example, the heart rate data for this user over prior exercise routines and store that the average heart rate measured from the user during rigorous exercise might be 150 bpm and the highest heart rate ever measured for this user is 180 bpm. The system can store for future comparison that a heart rate of 150 bpm is, therefore, a measure of extreme engagement and that if heart rate while viewing this particular program approaches or exceeds the historical maximum for this user, corrective action might be taken by pausing or shutting off the program. If, while watching a scary part of the movie, the user's heart rate exceeds 190 bpm or 200 bpm, and the set top box has stored that 180 bpm is the highest ever recorded for this user, and the set top has stored, based on the user's age and medical condition, that heart rates in excess of 190 bpm are potential problems and heart rates of over 200 bpm are medically dangerous, the set top box can stop the program and then continue to receive data to monitor the changes in, and hopefully reduction of, the user's heart rate.

The set top box 202 has stored in its memory information regarding the program being displayed and may use this information to request that the personal computing device 208 send user data. For example, the program might be one in which most users have a change in breathing rate and not a significant change in heart rate at different parts of the movie, as may happen in a romance program. Similarly, the program might be one which is most likely to evoke physical motion if the user is engaged in watching the program, such as a football game, cricket match, or the like. The set top box can send a query request at the start of the program to find out what types of data the personal computing device 208 is able to collect and can also direct it to focus on collecting and reporting on a more rapid basis the particular type of biological data that is most likely to change if the user is engaged in watching the program. The set top box may have data regarding this type of program based on previously collected crowd source data, as explained elsewhere herein.

Figure 1C:
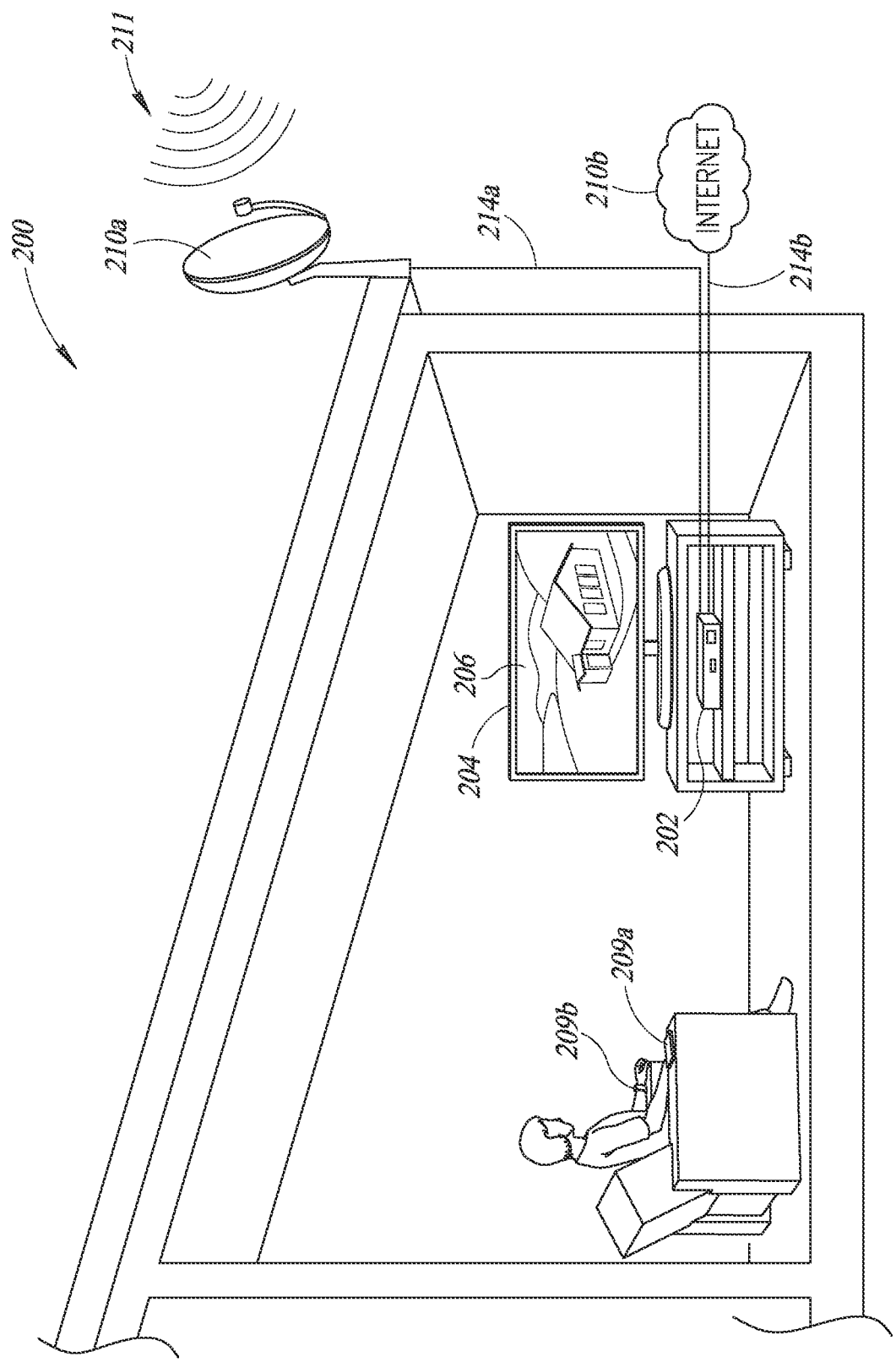
FIG. 1C shows the user in which some sensing devices are not coupled to the user and other biological sensing devices are coupled to the user while the user is viewing an audio/video program.

Thus, the ability of the set top box 202 to send a query to the personal computing device 208 and request user data has a number of benefits, some of which have been set forth herein. FIG. 1C indicates another set of circumstances under which the biological sensors of the user provide data to the set top box 202 while the display 204 is showing a program 206. In the example in FIG. 1C, there are two personal computing devices, a smartphone 209a and a smartwatch 209b. In this instance, the motion detectors and accelerometers indicate that the smartphone 209a has not moved for some period of time and is at a stationary location. These sensors may also include GPS sensors, position detection sensors, Wi-Fi sensors, and other positional devices which, whether using Wi-Fi, position GPS, or other systems, provide an indication of the position of the smartphone 209a and an indication it has not moved. The lack of movement of the smartphone 209a will be transmitted to the set top box 202 and provided an indication that it is not currently being coupled to the user and, therefore, is not a reliable source for sensing the biological functions of the user. The set top box 202 receives data from both the smartphone 209a, which is stationary and not coupled to the user, and smartwatch 209b, which is coupled to the user. By comparing the type of data received from the two computing devices, the set top box 202 will determine that the smartphone 209a is not a reliable indication of the current physical status of the user and will, therefore, not use data from that particular personal computing device in order to determine the user engagement with the program 206. The set top box 202, sensing heart rate, constant motion, and other factors from the smartwatch 209b, will prioritize data from the smartphone 209a in order to determine the biological functions of the user. If the user, during the middle of the program 206, picks up the smartphone 209a, either to view the smartphone or to answer a call, then the set top box 202 will receive an indication that the smartphone 209a has now been coupled to the user and will once again begin to use data from the smartphone 209a in order to determine the biological functions of the user in order to measure their engagement with the program 206.

The system can, therefore, determine if a user has fallen asleep and thus should pause the program. If the personal computing device 208 coupled to a user has no motion and/or senses a breathing and heart rate pattern indicative of sleep, then the set top box can turn the program off.

Figure 2:
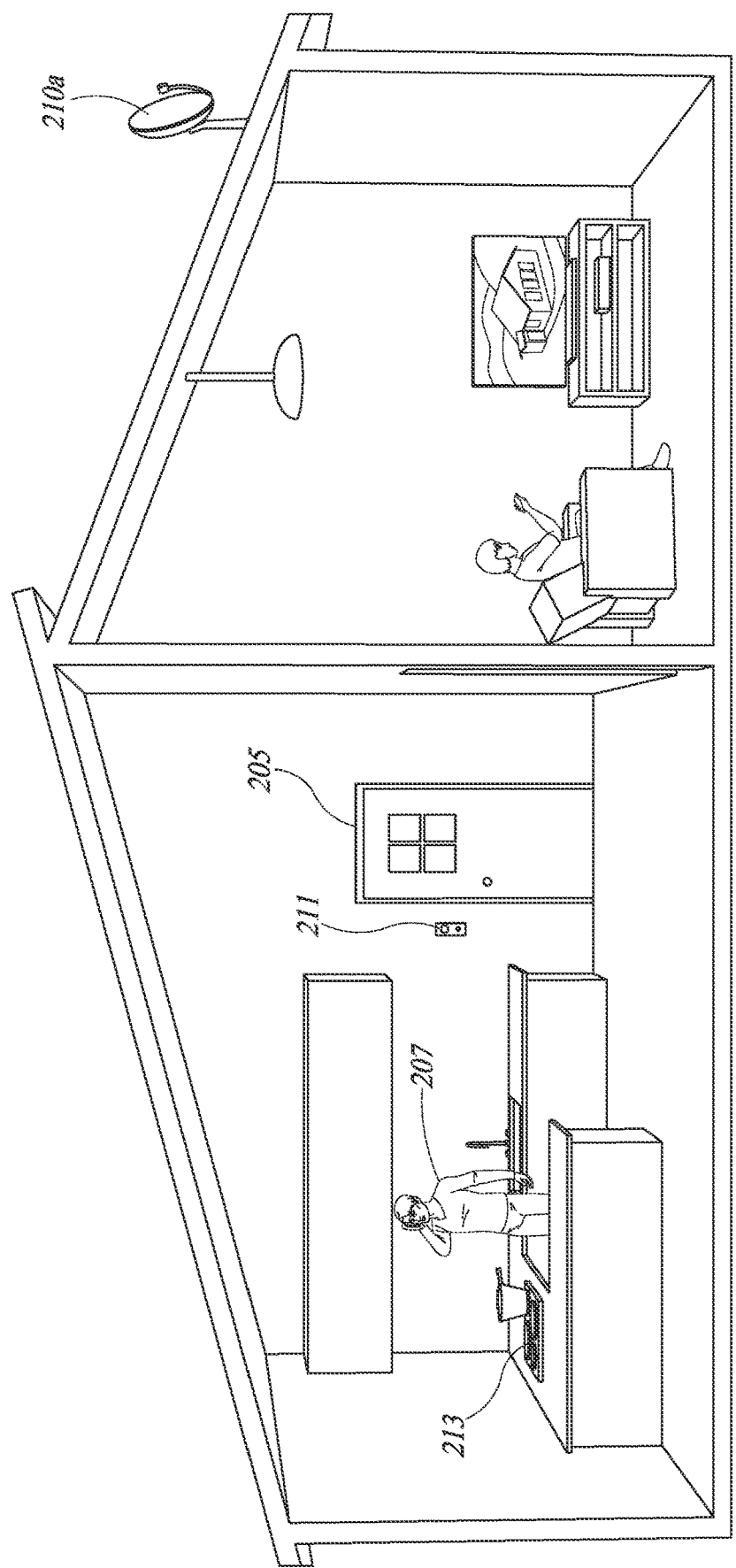
FIG. 2 illustrates the user watching an audio/video program while other activities occur in different parts of the household.

As shown in FIG. 2, interruptions can take any form. For example, besides being a notification on the personal computing device 208 that is coupled to the user 201, the interruption might be someone ringing the doorbell next to the door 205, the lights being turned on, such as by switch 211, or perhaps an appliance in the kitchen being used, such as a stove top 213 or toast popping out of a toaster. In modern day homes, which are connected with the Internet of Things, the set top box 202 will be receiving data based on other activities which occur in the home and if the biological sensor indicates that the user has left the room in order to attend to a function which happened in another part of the house, such as answering the door, opening the fridge, turning on the stove, or retrieving toast from the toaster, then the set top box 202 can automatically pause the display of the program 206 until the user returns to the room and is once again in a viewing position to be able to view the program 206.

FIG. 2 illustrates a situation in which other activities are happening in the home while the user 201 is watching the program 206. The personal computing device 208 is coupled to the user 201 while they are watching the program 206 under control of the set top box 202. While this occurs, they might receive a message or notification from another person, such as friend 207 who is in another part of the house, perhaps at a distant location. This person may request the user to stop the viewing of the program 206 and come to a different part of the house. The set top box 202 will be monitoring the activity of the personal computing device 208 and realizing that the user is leaving the room, it can automatically pause the program 206 so that when the user returns to the room it is at the very same place as when they left the room. Similarly, if the interruption comes from another source, such as a person ringing the doorbell, an activity outside the house, or other distraction, the set top box 202 will have determined the level of engagement of the user. In the event that the set top box 202 determines that the user has little to no engagement with the program, it will continue to display the program and not pause. It will have made a determination that the interest of the user in the program is very low and, therefore, will not need to pause or save the program even though the user has left the room. On the other hand, if the user engagement was very high as measured by methods previously described herein, the set top box 202 can pause the program and, if the pausing of the program causes it to be beyond the pause time of the set top box 202, then the set top box can automatically record the program so that it can be later viewed by the user when they have more time.

Figure 3:
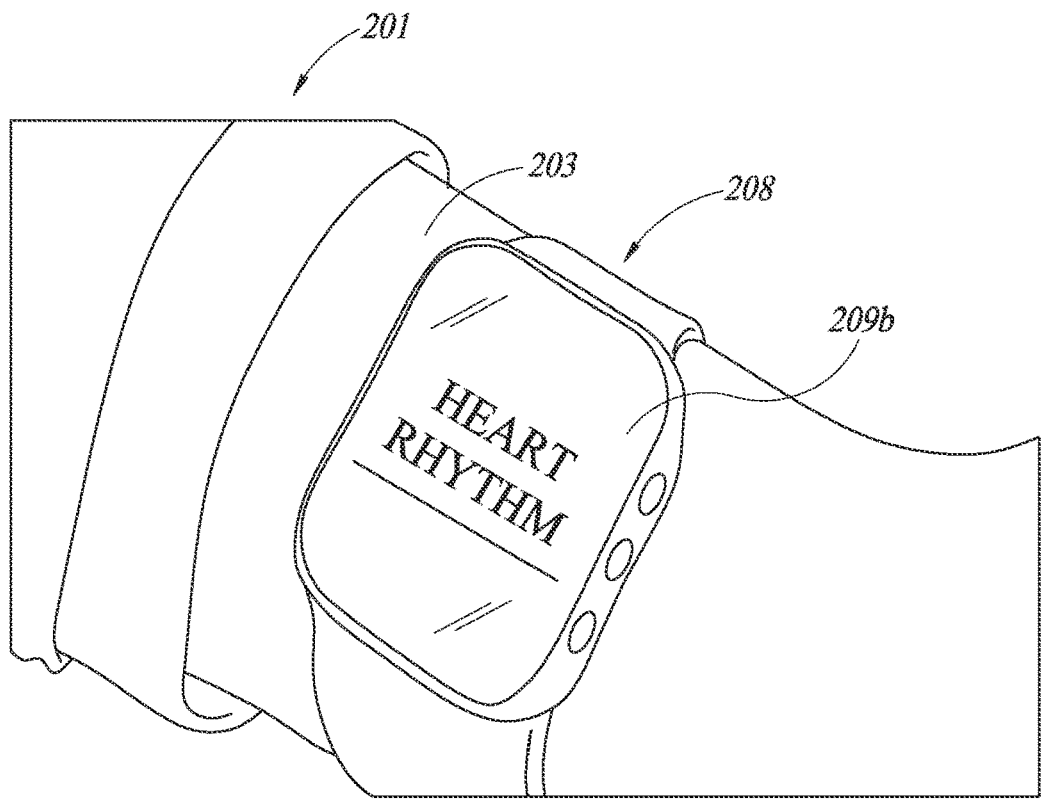
FIG. 3 is an enlarged view of a biological sensor coupled to a user.

FIG. 3 indicates a specific operation in sensing the biological function of a user. In this example, user 201 has a smartwatch 209b acting as the personal computing device 208 which is coupled to the wrist 203 of the user. In the example shown, the smartwatch is sensing the heart rhythm of the user, a function that is well known to be capable of smartwatches. During the exact same timeframe at which the heart rhythm is being determined, the type of content of the program 206 is being tracked and stored in the memory of the set top box 202. Specifically, while the set top box 202 is displaying a program 206 on the display 204, the personal computing device 208 is sensing biological functions of the user. This biological function data of the user is received at the set top box 202 from the personal computing device. This is received during a first time period while the program is being displayed to the user. The content of the program that was being shown during the very same time period during which the biological data was being measured by the sensors at the user are compared. A time stamp can be placed on the data as received at the set top box from the biological sensor in the personal computing device 208 and compared to any particular time within the time period in which the program 206 was being displayed in order to match the timing of the biological functions of the user with every single change of events in the program 206. By measuring the level of the correlation between the type of content in the program and changes in the biological function of the user for the same time period, the level of engagement of the user with the program can be determined. If there is a strong match between changes in the biological function of the user and the changes in the content of the program, then this is stored in the memory of the set top box 202 as a high engagement level of the user with the program. Accordingly, the comparison circuit will output a signal indicating the level of the user engagement with the program 206 as being very high based on there being a strong correlation between changes in the biological function of the user that match changes in the program content. Similarly, if there are little or no changes in the biological function of the user, such as heart rate with very dramatic changes in the program 206, then the set top box 202 will store data indicating that there is not a strong correlation between the content of the program 206 and the changes in the biological function of the user 201, and indicate that there is a low level of user engagement with viewing the program 206.

The level of engagement of the user with the program being viewed can be ranked according to different techniques. For example, a numerical ranking can be provided with zero being no engagement, five being medium engagement, eight being robust engagement, nine and 10 being even more engagement, for example intense or so high as to be overly engaged. The level of engagement can also be labeled with subjective parameters, such as no engagement, low engagement, medium engagement, interest, robust engagement, intense engagement, or higher than intense, such as so intense as to create nervousness or panic in the viewer. Such overly intense engagement level may occur for a highly engaged fan of a sporting event, an anxious person during a very scary part of the movie, or other type of circumstance. Thus, the level of engagement can be given a particular score indicating the amount of engagement by the user.

Once the set top box has determined the level of engagement of the user 201 with the program 206, then it can be programmed to make a determination regarding what to do in the event of changes in the user's activity during the program. If the engagement has been previously measured as very high, then when a notification is received by the user, it can automatically pause or even rewind or store the program while the user is interrupted with a notification or having to leave the room. On the other hand, if the set top box 202 has determined that the user's engagement is very low, then it can continue to run the program and display the program 206.

Having the signals 212 received and analyzed at the set top box 202 using the metadata of the program 206 and the biological function data from the personal computing devices 208, and the set top box 202 comparing the type of content in the program to changes in the biological function and outputting an engagement level provides a number of benefits. A first benefit is that the level of correlation between the program 206 and the biological functions of the user during the same time period will be immediately locally obtained, a correlation determined, and stored in the set top box. A further benefit is that the level of the user engagement can be output from the measuring and correlation circuit in the set top box to an action determination circuit within that set top box in order to determine what action should be taken in the event of an interruption to the user while the program 206 is being shown on the display 204. This permits the set top box to immediately respond to the particular circumstance at hand and provide the most viewing benefits to the particular user.

Figure 4:
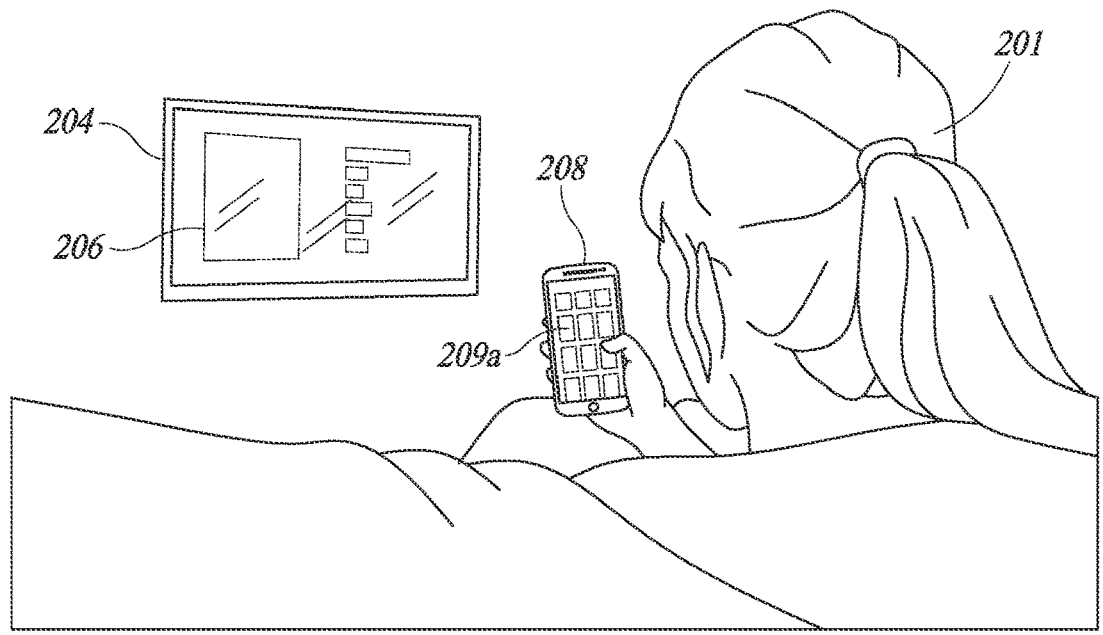
FIG. 4 is an enlarged view of a different biological sensor coupled to a user while viewing an audio/video program.

FIG. 4 indicates a user making use of a personal computing device 208 at the same time that a program 206 is being shown on display 204. In the instance of FIG. 4, a personal computing device 208, in this instance a smartphone 209a, is coupled to a user 201 by being held in the user's hand. The use of the smartphone 209a is being sensed by the set top box 202 at the same time the program is being displayed. In the particular example of FIG. 4, the user 201 is scrolling to different pages in the smartphone 209a. In addition, the camera and microphone in the smartphone might indicate that the user is looking directly at the smartphone 209a. One or more of these will be a strong indication that the user is not engaged with the program 206. If it is known that the user is looking at their smartphone 209a and not looking at all at the display 204, then this will indicate lower user engagement. The personal computing device 208 has therefore collected biological data on the user 201 indicating that they are looking at the smartphone 209a and making use of it and they have no engagement with the program 206. This data is sent to the set top box 202 which measures the correlation between the type of content of the program 206 and notes that the user was not sufficiently engaged to even be viewing the program 206 when it was directly in front of their view. In such a situation, it will output a signal indicating a low level of engagement with the program 206 based on the results of measuring the correlation of the content of the program and the biological functions of the user 201, namely the biological function of the user having their eyes or face focused on the smartphone rather than looking at the display 204. Accordingly, even if the user is not scrolling or touching the screen of their smartphone, if the internal camera of the smartphone senses or measures that the user's face or eyes are directed to the screen of the smartphone then this will be an indication that the user is not engaged in looking at the program 206 at all, but is instead engaged in looking at their smartphone. Thus the viewing location of the eyes of the user 201 provides the biological function report of the level of interest. This may or may not be coupled with other types of measurements from the smartphone, such as whether the user is scrolling or changing programs on the smartphone. In addition, if it is determined that the user is looking at their smartphone and scrolling, then movement of the user's hand or changes in heart rate can be discounted as not being associated with the engagement in the content of the program 206. Thus, the combination of biological functions, such as the location of the eyes of the user, and movement of certain appendages, such as one hand or the fingers of a hand, can be combined and measured together in order to reach a determination of the level of engagement by the user with the program 206.

Figure 5:
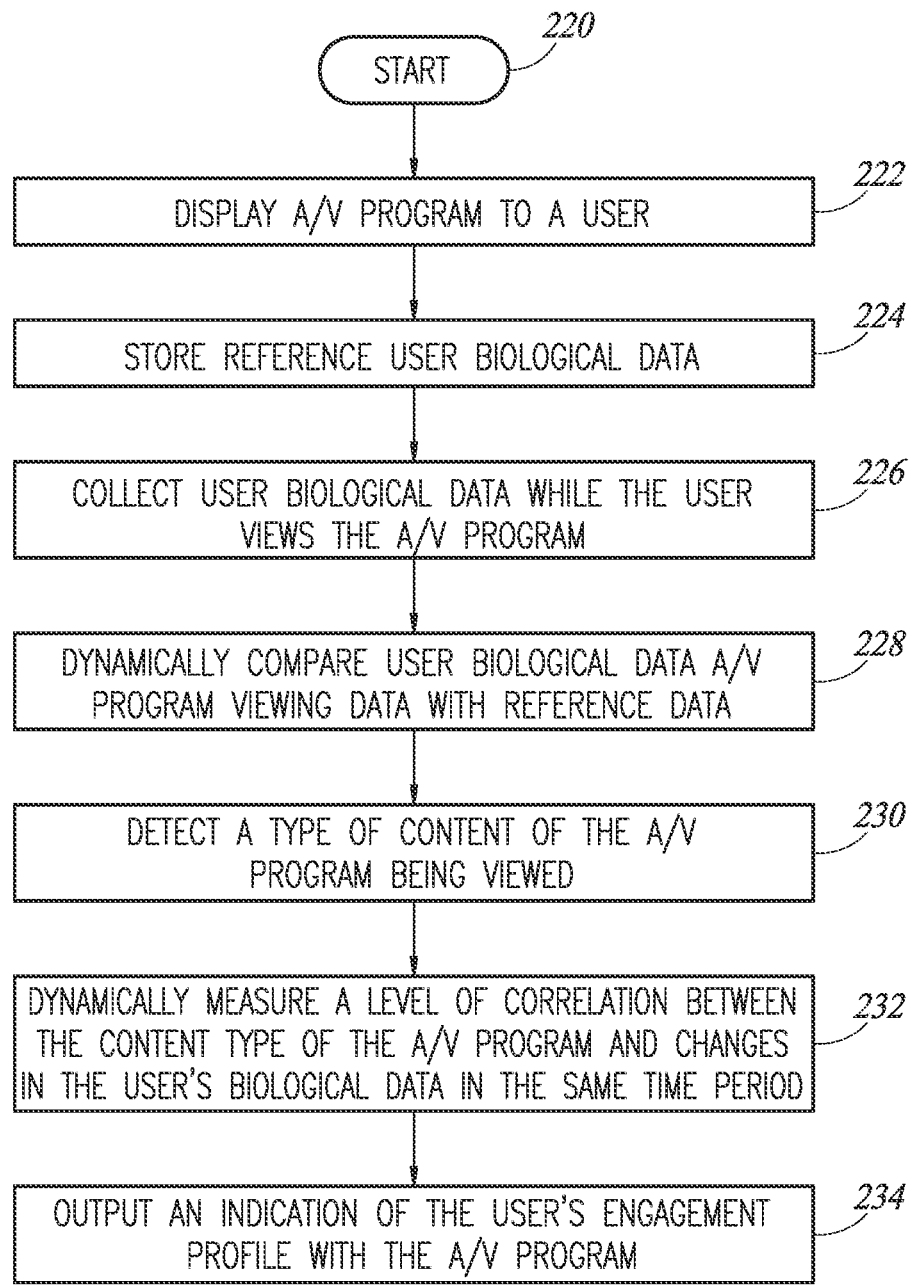
FIG. 5 is a flowchart illustrating a first embodiment of operation of the inventive method.

FIG. 5 is a flowchart indicating a sequence of steps which are carried out according to one embodiment of the present disclosure. In a first step, the program within the set top box 202 starts at step 220. Subsequently, a program 206 is displayed on the display 204 during step 222. The user which is watching the program 206 is then determined. This identified user can be determined based on the personal computing device 208 which is coupled to the user and the data which is obtained from the personal computing device based on the orientation of the user, the personal computing device, or other data which is being collected. Thus, the identity of the user and the particular type of computing device is received as data in the set top box 202. The identity of the user is therefore stored in the set top box 202, whether one of the parents, a child, or another person in the home. The set top box 202 will review its memory to see if it has stored reference biological data of that particular user in step 224. If the user has previously been watching several programs 206 that are being provided by the same set top box 202, the set top box 202 will have a large amount of reference biological data of this user. It will have stored therein reference data showing how the user normally views the program, their heart rate during normal parts of the program, as well as the changes in heart rate, breathing rate, and other biological data of the user during many programs which they have viewed. On the other hand, if the set top box 202 does not previously have reference data for the user, then for the first segment of the program 206 being displayed, the set top box 202 will collect and store reference biological data of the user. Throughout the entire showing of the program 206, the set top box will continue to sense and store reference biological data of the particular user. If the data remains stable for long periods of time, this can be considered acceptable reference data as a baseline in order to provide a comparison to changes in the biological data of the user. After a reference set of biological data has been collected for the user, whether for a brief period of time which might be only a matter of minutes or for a longer period of time which may span several prior days or several prior hours and a number of prior viewings by the same user, then the set top box will be prepared to collect additional biological data as the user watches the program in step 226. As additional biological data is stored, as the user watches the program 206, this is dynamically compared against the reference data which is stored in the set top box memory. If the data being collected is of the same type, for example, shows the same heart rhythm, breathing rate, movement characteristics and other features of all of the data which has been collected so far or of the reference data, then it can continue to be stored as reference data and also begin to provide an indication of a level of engagement of the user with the program. Next, the comparison of the user biological data with the reference biological data and the A/V program being viewed are dynamically carried out in steps 228, 230 and 232. The comparison is dynamic because it continues on a continuous basis. As the user biological functions change, new data is received live, concurrently with the changes occurring, then the comparison is carried out immediately thereafter to compare the just collected data with the type of content that was just shown during the exact time period in which the biological data was sensed and collected from the user, as occurs in steps 230 and 232. This continues for subsequent time periods, with the biological data and the type of content being updated for each new comparison and thus carries out the dynamic measurement of the level of correlation between the content of the A/V program and the changes of the biological functions of the viewer that occurred in the same time period in step 232. During this time, the dynamic comparison between the collected biological data and the concurrent type of program being displayed on the display tool for a particular content of the program 206 can be determined. If the content is determined to be of a drastic change, for example, a sudden scary scene, an action-packed car chase, a very romantic scene or other drastic change in the program being displayed, this is noted in step 230. During these drastic changes in the content of the program 206 being displayed, the biological functions of the user are being sensed. If there is a rapid change in the biological functions of the user, such as heart rate, breathing rate, jumping, moving, or other changes as previously discussed, then it can be determined that the user is in fact highly engaged in the program. A measure of the correlation between the content of the program 206 being displayed and changes in the user's biological data can be stored in step 232, thus completing the dynamic comparison and correlation. After these changes are stored, they are saved in the set top box 202 in the onboard memory. The onboard memory can therefore output an indication of the user's engagement profile with the particular program 206 which it is displaying during this same time period in step 234. This user engagement profile can show the engagement of the user over the length of the entire program 206.

The level of engagement may change during different parts of the program based on different factors. The program may reach a place at which the level of action is low and this may be correlated to a low amount of user engagement. Similarly, the personal computing device of the user may indicate that the user is carrying out other activities and therefore has been interrupted, distracted, or otherwise is carrying out other activities rather than concentrating on viewing the program 206. Then as the program continues to be viewed, the user may once again become more heavily engaged in the program and show a high level of correlation between activities that are being displayed in the program 206 and their own personal biological functions. Thus, a measure can be made as to what parts of the program 206 caught the viewer's attention and caused them to once again be engaged in the program.

Figure 6:
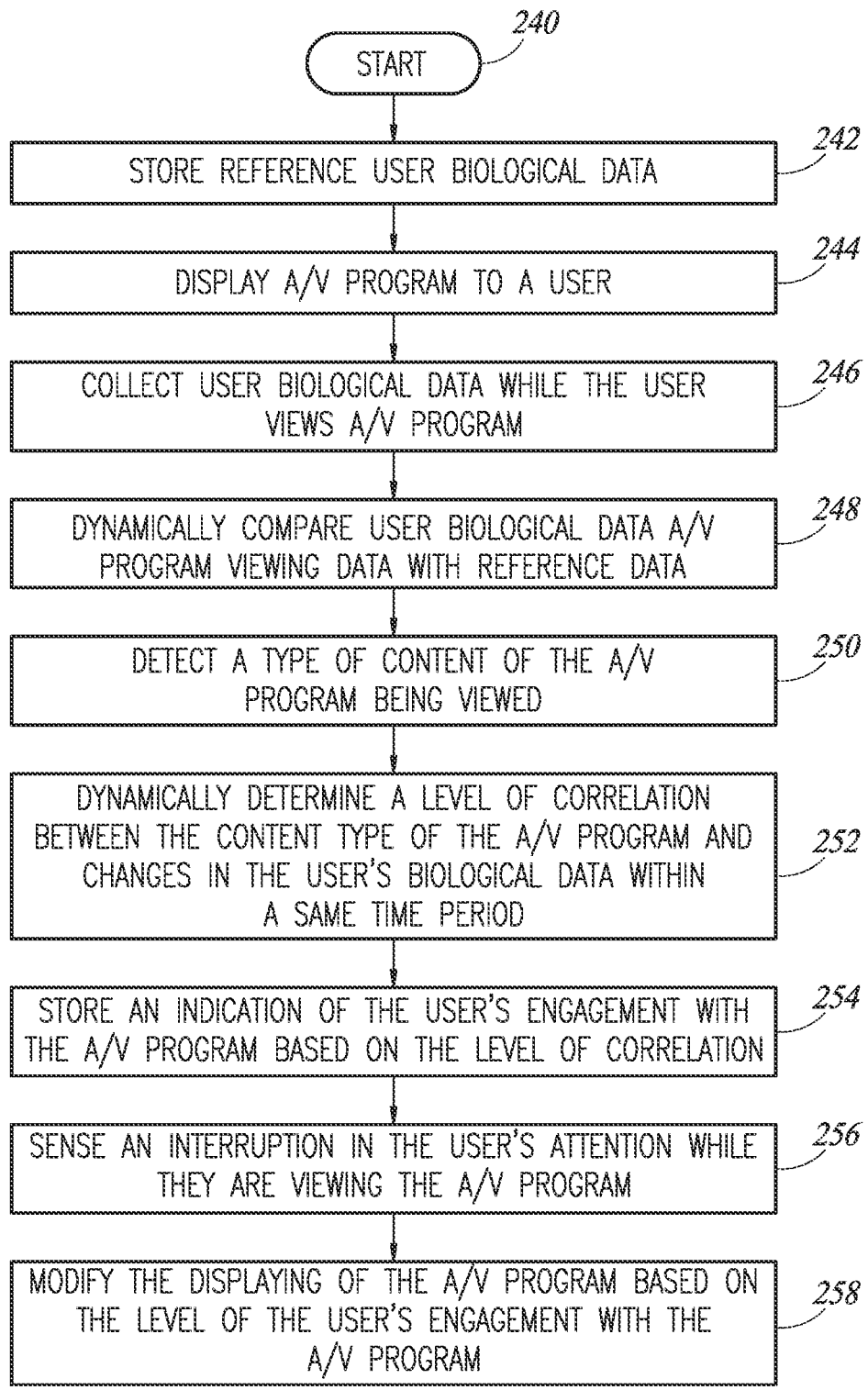
FIG. 6 is a flowchart illustrating a second embodiment of the inventive method.

FIG. 6 illustrates an alternative embodiment for the user engagement determination. According to the embodiment of FIG. 6, the program starts at step 240 and then advances to step 242 in which reference user biological data is stored at the local set top box. This reference user biological data can be obtained from a large database previous to the user having even viewed this particular program. Namely, as explained later herein, this particular program may have been viewed by many thousands of users and biological data collected while the many users were viewing the program. This creates a large user database of reference data that is matched to the particular program being viewed. This can be used as the reference user biological data instead of the personal reference biological data that is specific to that particular user as shown in the embodiment of FIG. 5. After the biological data of a group of users, or in some instances just the user themselves, has been stored in the memory of the set top box 202, then the program is displayed to the user in step 244. As the user watches the program, signals 212 are sent from the personal computing device 208 to the set top box 202 in which it collects user biological data while the user is viewing the program in step 246. While the program continues to be displayed, the set top box will dynamically compare the user biological data to the type of content in the program being viewed with the reference data, as shown in step 248. In particular, as shown in step 248, based on the metadata and other factors available to the set top box in the video stream being displayed, the type of content of the program being viewed can be detected. There are a number of techniques available in the art, including metadata, analyzing of the data stream, the music, and other techniques that can be used to detect the type of content at a particular point in time of the program being displayed, as shown in step 250. Following this, in step 252, a determination is made of the level of correlation between the content type of the program and changes to the user's biological data within the same time frame. Based on the level of match between changes in the user's biological data and the type of content, an indication is created of the user's engagement with the program based on the level of correlation as set forth in step 254. This is stored in the memory of the set top box. As the user continues to watch the program, in step 256 an interruption may occur in the user's attention while they are viewing the program. The processor in the set top box analyzes the level of engagement of the user and then modifies the displaying of the program based on the level of the user's engagement that has been previously determined for that particular program in step 258.

This particular embodiment, as shown in FIG. 6, is one acceptable beneficial use of the measurement of the engagement of the user in a particular program while viewing on their local set top box 202.

Figure 7:
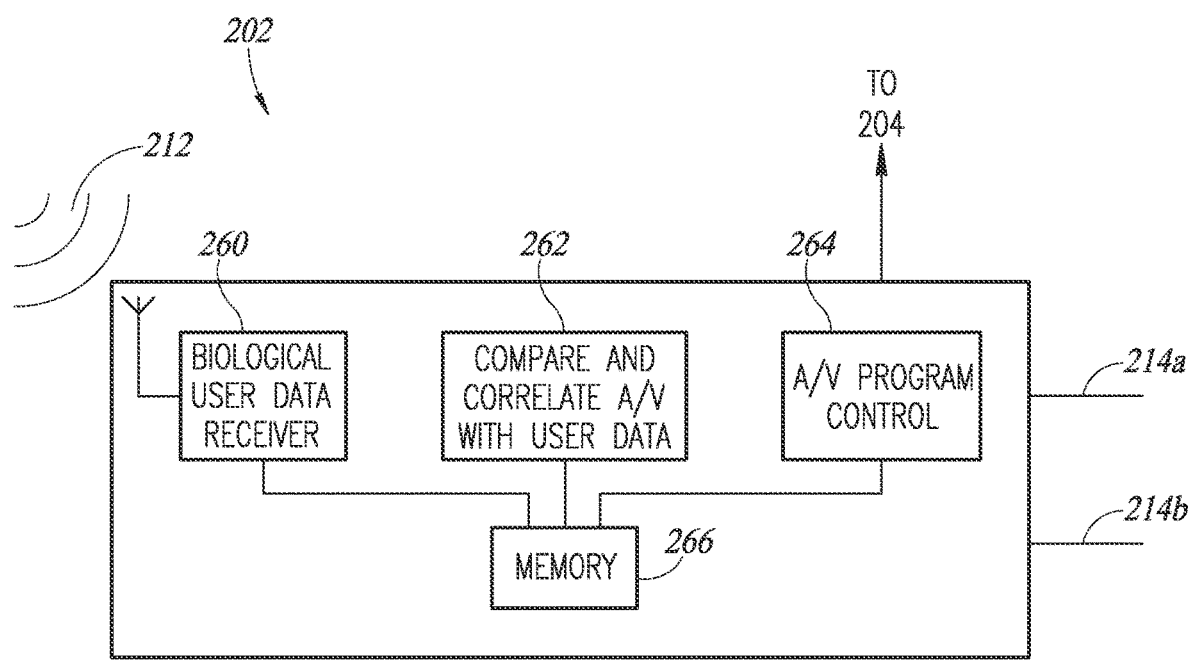
FIG. 7 is a block diagram illustrating circuits in a set top box according to the present disclosure.

FIG. 7 is a block diagram of some of the circuits in a set top box 202 according to the disclosure herein. The set box 202 includes many circuits, software programs, transceivers, antenna, and different systems in order to perform its function as a set top box which are not shown since they are well known in the art and standard in most set top boxes. Those systems, whether circuits or software, shown in FIG. 7 are the additional ones provided as part of this disclosure to carry out the additional functions as described and claimed herein. As previously stated, signal 212 brings biological data from the user to the set top box 202. Inside the set top box 202 will be an antenna coupled to a biological user data receiver circuit 260. This data receiver will properly analyze and digitize the biological data from the user and store it in a memory 266. At the same time that biological data is being collected by circuit 260, a program control circuit 264 is sending a program to display 204 in order to display the program 206. This program can be received from a satellite dish via line 214a, the Internet 214b, or other location. This is provided into the set top box 202, transmitted to the program control circuit 264 which outputs it to the display 204 as shown in FIG. 7. In addition, at the same time it is outputting the program content to the display 204, the type of content being shown at any particular moment, together with appropriate time stamps and metadata, is being stored in the memory 266. The memory 266, therefore, includes stored therein the biological user data and changes in the biological user data, as well as the program metadata and program content details, as well as changes in the type of program as the program is being displayed. Circuit 262 is able to retrieve all of the data from these two sources from the memory 266 and then compare and correlate the program data with the user data. Each of the circuits 260, 262, and 264 can be processors of any acceptable type and having stored therein the appropriate software programs constructed as described herein and shown in the flow charts in order to perform the functions. Alternatively, the circuits 260, 262, and 264 can be a single processor and the functions being listed can be software programs stored and executed by a single or multiple processors. The memory 266 can be a separate memory of the set top box 202, or it can be a memory within any one of the circuits 260, 262, 264, or a in a different, single processor that is the circuit to carry out the claimed operations.

There are a number of benefits that can be obtained from this particular system. The first benefit is that there is a more realistic and practical approach in determining the user's level of engagement with a particular program 206. Further, the details of the particular type of engagement can be matched closely to the content of the program 206 during the time that the engagement took place. Thus, the interest of the user in any particular segment of the program can be backed by data. This data, which can directly correlate the level of user engagement with particular scenes or parts of the program 206 can be very valuable in determining where to pause the program, when commercials should be shown, when commercials should not be shown, and also provide a benefit of guidance to future directors in making programs which will engage the users at desired locations.

Of further benefit is the ability to incorporate content for showing to the viewer and content for showing to the user 201 into the recommendation engine. For example, if it is known that the user is highly engaged in a certain type of movies, such as the romantic genre, then the recommendations to the viewer to the user 201 can bring similar type movies to the attention of the user 201. On the other hand, if the correlation shows that during certain types of scenes, such as westerns, the user is not engaged, this information can also indicate as to what types of programs should not be displayed to the user 201. This type of information is particularly valuable to content creators as they fine tune the programs which will be shown on the displays 204 to the various users.

Of further benefit is that the identity of the user is known and matched to the particular program. The personal computing devices 208 are personal to each person viewing the program. It is very likely that two, three, or more people watching the program will have very different responses to the very same program. If the situation occurs in which two companions such as a man and a woman are watching the same program, the personal computing devices of each will have the data collected and stored in the set top box 202 that is custom to each of them. If people come into the room or leave the room in which the program is being displayed, the set top box 202 will receive signals 212 from each of these personal computing device 208 and keep a record of who is currently watching, who came into the room, who left and the point in the movie they came or left, as further data to correlate, track, and determine user engagement for each particular viewer.

The set top box 202 will have a record that two or more people are watching the program and will be making a correlation for each of them as they watch the program. If the interest of one of the viewers is particularly high but the interest of another viewer is particularly low for the very same program 206 which is displayed at the same time to each, then an indication can be made as to the type of content each particular user prefers. Since all the other conditions are the same, the same time and the same program in the same room, the only difference being the different users watching the same program 206, then a correlation could be made that is more based on particular user viewing the program and not to the content of the program itself. For example, it could be determined that both people are equally scared at scary parts of a movie, but for the man may be more engaged in a particular scene, such as a sporting even with a home run being hit in a baseball game or a football touchdown, whereas the woman may be more engaged in a drama, a high speed car chase, or a romantic scene of a movie. The way in which each user's engagement is measured might be different as well. The user engagement by one person might be measured based on physical movement or changes in heart rate, but a different person who has been measured to be active when they are doing things other than watching the program might be determined to be fully engaged with the viewing of the movie when they are absolutely still and do not move at all. Namely, the person was so engrossed in the movie that they became riveted on the program action and had no movement at all. But the system has a record of their breathing pattern and heart rate and determines they are asleep. As has been discussed, in one embodiment, for each individual user, there is established some reference data which may include a baseline of a heart rate, a blood pressure, a resting heart rate, an amount of movement which is common while watching a program or other types of user data. These will be based on that particular user's viewing habits and their physical movement during such viewing. As more and more time goes by with the same user watching programs through the same set top box 202, then substantially more reference data can be collected. This reference data can be used to track whether changes in the heart rate of a user are the same for each scary movie and can also measure which scenes might be more or less scary to a user based on changes in heart rate from one scene to the other.

A further benefit of the current system is the ability to collect and use crowd sourced data. The system is able to receive and store hundreds or thousands of people watching the same movie, each with their own set top box 202 viewing in their own homes or at a common venue, such as a movie theater. Data can be collected at a prior location using crowd sourcing of hundreds of people watching a movie at a different venue. Regardless of where the people are watching the movie, the personal biological functions of each user can be stored, correlated, and accumulated. For example, in the embodiments described herein, the set top box 202 stores and holds the data for each individual user which has watched programs on the same display 204 which is driven by the set top box 202 on a periodic basis, such as once a week or each evening. The set top box 202 can download via the Internet 210b as shown in FIG. 1A, the data which has been collected for each of the users for the last several days or the last period of time. This data can include a report of each of the programs 206 which was shown on the display 204 and also a listing of the correlation of the user engagement to every part of the program for every such program. Thus, a large amount of data can be collected from many thousands of homes and sent to a central computing system. All of this data can be collected and analyzed to determine the general response of the people to certain scenes in the movie. For example, a determination can be made whether or not generally, each person's heart rate climbed at exactly the same time in the same point in the movie, a determination can be made whether or not each person started to jump or was startled at the same time in the very same movie. Thus, with the downloading of the user data and the correlation with the program on the Internet 210b to a central system, the specific response of a group of users can be reviewed and determined.

Having a large body of reference data from many thousands of users provides the benefit that this can then be sent back to the set top boxes 202 as crowdsourced reference data. The reference data could also include, besides the user-specific reference data, a crowdsource-specific reference data. If experience shows that over 90% of all users have an increased heart rate at a certain part in a movie, but this particular user has no change in heart rate or does not jump at the same scene in the movie when shown, then this can also be used as a determination that the user is not engaged in viewing a particular program 206 being displayed on the display 204. Thus, in one embodiment, the reference biological data can be from crowdsource data based on an expected response of the average user watching the program and need not be specific to that particular user watching that program. In this instance, the comparison between the reference data and the specific current biological data of the user is a comparison between a crowdsourced reference data with specific data of that specific user for the same timeframe of the program 206. Thus, it is possible to build a history of what hundreds of people did during different scenes and then track whether the current person is following the expected pattern at certain segments or certain scenes in the movie. This will permit the system to prepare in advance if a particular part is about to be shown. As one example, if the user's heart rate is already very elevated at this time and based on the user's viewing pattern, health history and engagement, the system projects that the user's heart rate will reach an unhealthy level in the next scene, the system can send a warning to the user via screen or a message to the personal computing device 208 that a more intense scene is about to be displayed. It can also stop the program and wait for the user's heart rate to decrease. Once it has received data that the user's heart rate has been reduced to a safe level, which will be custom and different for each user, it can then restart the program to show the next scene, skip over the intense scene or take other action. The system can also be used to skip a scene based on the user. The set top box will know the identity and user profile of each viewer since this information was requested and downloaded from each of the personal computing devices 208 that are personal to each specific viewer currently watching the program. As noted before, there might be many people watching the same program 206 on the same display 204 and the system will have stored a record of each and track each of their engagement levels. If the program is about to show a graphic sex scene that young people should avoid and the system recognizes that a young person is now viewing the program, even if they were not there at the start, but started viewing later, it can stop the program just prior to the graphic sex scene and then skip over it, give a warning, or wait until the minor has left the viewing area, as can be determined by knowing the changes in location of the personal computing device coupled to them as an individuals.

If a large body of data, and a correlation of user engagement to that data has been collected for a particular program, this can be stored in a central database and be very useful to content providers. The content provider can determine the type of scene which will invoke a high level of engagement with users. Accordingly, rather than relying on test audiences or estimations based on their own personal interest, the content provider, such as the producer of a movie or director, can determine the type of content, which is very likely to result in lasting, long-term engagement of a user with a program. Accordingly, the content provider can design programs that maintain a certain level of engagement throughout the entire program and then, at particular times, create an even higher level of user engagement.

Of particular benefit is that the collection and the analysis of the data is done by the set top box itself. The set top box has available to it the metadata of the program 206 being displayed, the location of the various scenes, and also may receive on a constant basis input from the personal computing devices 208 which are coupled to the user 201.

The set top box can then learn to take action based on the data which is completed. If the user would normally pause the movie each time the phone rings, the set top box can learn this based on repeated actions of the same user and when the phone rings the set top box can do an automatic pause so that the user can answer the phone and not have to pause the control themselves. It can also learn the style of engagement and customize the response of the set top box based on expected desired actions that the user may carry out based on certain actions taken. Similarly, the set top box can perform automatic volume reduction or volume increase based on the engagement with the user.

Since the set top box is collecting user-specific data and biological data for that user, the system can also be used for parental controls. The set top box will sense that the personal computing device, whether smart phone or smart watch, is that of a child in the home, whether a young child, or a teenage youth. If the program being displayed is one that should have been blocked, whether a very scary scene or a graphic sex scene, then the set top box will have a record that the particular user having their particular computing device was watching that particular movie which they should have been blocked from seeing. Further, it will be recording the biological responses of the child while the program 206 is being displayed. The set top box will have stored therein the knowledge that parental guidelines have been installed and that these have been overwritten, or a password was entered, which the child should not have been able to do. Thus, if there are parental blocks that are supposed to be installed, the system can use this to take action to further assist the parent, such as sending a notification to the parent that a person is watching a scene which they should have been blocked from seeing. Further, the system can automatically skip different scenes that the metadata indicates are coming up if the user watching is known to be a person who is supposed to be blocked from such scenes. This automatic skip or blocking can take place even though the normal parental controls have been overwritten, such as by putting in the password, because the set top box 202 knows the identity of the user watching that particular program 206.

Another benefit of the use of personal computing devices is that the system could track the activity of the personal computing device with that of an expected activity during watching a program 206. For example, a determination could be made whether or not the phone is in a pocket and making small movements that would be expected of somebody having a phone in their pocket as they sit in the chair or walk back and forth watching a movie. This can be compared to whether or not the phone is being held in a hand which would have a much larger range of motion, more frequent motions, and also perhaps more stark, jumpy, or sharp motions. In addition, the motion of two computing devices that are coupled to the same user can be compared to each other. In one embodiment, one computing device may be a smart watch coupled to the wrist of the user while the other computing device is a smart phone which may be in the pocket, or held in the hand of the user. In this instance, the movement of the smart phone can be compared to the movement of the smart watch on the wrist of the user. The system can compare the biological data including motion data, heart rate and other data received from each of these separate personal computing devices and the biological data they collect. By comparing this it can be determined whether the hands were moving at different rates, whether a particular motion was based on the whole body moving, or just an arm moving and other features.

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. Aspects of the embodiments can be modified, if necessary to employ concepts of the various patents, applications, and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of measuring user engagement with an audio/video program comprising:
   storing reference biological user data in a memory in a set top box;
   outputting the audio/video program from the set top box to a display;
   receiving an indication from a personal computing device having a plurality of biological function sensors coupled to a user, the indication being that the user is viewing the audio/video program;
   in response to receiving the indication, sending a query from the set top box to the personal computing device to obtain a health history of the user and types of biological function data capturable by the plurality of biological function sensors;
   receiving, from the personal computing device, the health history of the user and the types of biological function data capturable by the plurality of biological function sensors;
   obtaining a viewing pattern of the user;
   generating an engagement-threshold profile for the user based on the health history and the viewing-pattern of the user;
   selecting, at least one biological function type for the personal computing device to capture from the plurality of biological function sensors based on the engagement-threshold profile and the viewing pattern of the user;
   instructing the personal computing device to capture biological function data of the selected at least one biological function type;
   while the audio/video program is being output to the display:
      receiving, from the personal computing device, the biological function data of the selected at least one biological function type of the user captured by at least one of the plurality of biological function sensors during a first time period of the audio/video program;
      determining a first level of engagement of the user for a first type of content in the data received from the personal computing device;
      prior to a second time period that is after the first time period, predicting a second level of engagement of the user for a second type of content in the audio/ video program to be output during the second time period based on the first level of engagement, the viewing pattern of the user, the health history of the user, and the reference biological user data;
      comparing the predicted second level of engagement of the user for the second type of content for the second time period with the engagement-threshold profile for the user; and
      outputting a signal indicating a result of the comparison between the predicted second level of engagement of the user for the second type of content for the second time period and the engagement-threshold profile for the user.

2. The method of claim 1, further comprising:
stopping the outputting of the audio/video program from the set top box to the display if the predicted second level of engagement is above a threshold level defined by the engagement-threshold profile for the user.

3. The method of claim 1, further comprising:
stopping the outputting of the audio/video program data from the set top box to the display if the predicted second level of engagement is below a threshold level defined by the engagement-threshold profile for the user.

4. The method of claim 1, further comprising:
sensing that a notification has been received by the user at the personal computing device;
determining an interaction level at which the user interacts with the notification received at the personal computing device; and
changing the first level of engagement based on the interaction level at which the user interacts with the notification received at the personal computing device.

5. The method of claim 4, further comprising:
pausing the outputting of the audio/video program if the first level of engagement when the notification was received changes from a high level to a low level.

6. The method of claim 1, further comprising:
receiving a second indication from a second personal computing device having a second plurality of biological function sensors coupled to a second user, the second indication being that the second user is viewing the audio/video program;
in response to receiving the second indication, sending a second query from the set top box to the second personal computing device to obtain a second health history of the second user and types of biological function data capturable by the second plurality of biological function sensors;
receiving, from the second personal computing device, the second health history of the second user and the types of biological function data capturable by the second plurality of biological function sensors;
obtaining a second viewing pattern of the second user;
generating a second engagement-threshold profile for the second user based on the second health history and the second viewing pattern of the second user;
selecting at least one second biological function type for the second personal computing device to obtain from the second plurality of biological function sensors based on the second engagement-threshold profile and the second viewing pattern of the second user;
while the audio/video program is being output to the display;
receiving from the second personal computing device, second biological function data of the selected at least one second biological function type of the second user captured by at least one of the second plurality of biological function sensors during the first time period of the audio/visual program;
determining a third level of engagement of the second user for the first type of content in the audio/video program being output during the first time period based on the second biological function data received from the second personal computing device;
prior to the second time period, predicting a fourth level of engagement of the second user for the second type of content in the audio/video program to be output during the second time period based on the third level of engagement, the second viewing pattern of the second user, the second health history of the second user, and the reference biological user data;
comparing the predicted fourth level of engagement of the second user for the second type of content for the second time period with the second engagement-threshold profile for the second user; and
outputting a second signal indicating a second result of the comparison between the predicted fourth level of engagement of the second user for the second type of content for the second time period and the second engagement-threshold profile for the second user.

7. A method of measuring user engagement with an audio/video program comprising:
displaying an audio/video program to a user while a personal computing device having a plurality of biological function sensors that are coupled to the user;
receiving, from the personal computing device, an indication that the user is viewing the audio/video program;
in response to receiving the indication, sending a query to the personal computing device to obtain a health history of the user and types of biological function data capturable by the plurality of biological function sensors;
receiving, from the personal computing device, the health history of the user and the types of biological function data capturable by the plurality of biological function sensors;
obtaining a viewing pattern of the user;
generating an engagement-threshold profile for the user based on the health history and the viewing pattern of the user;
selecting at least one biological function type for the personal computing device to capture from the plurality of biological function sensors based on the engagement-threshold profile and the viewing pattern of the user;
instructing the personal computing device to capture biological function data of the selected at least one biological function type;
receiving, from the personal computing device, the biological function data of the selected at least one biological function type of the user captured by at least one of the plurality of biological function sensors during a first time period while the audio/video program is being displayed to the user;
determining a first level of engagement of the user for a first type of content in the audio/video program being displayed during the first time period based on the biological function data received from the personal computing device;
prior to a second time period that is after the first time period, predicting a second level of engagement of the user for a second type of content in the audio/video program to be displayed during the second time period based on the first level of engagement, the viewing pattern of the user, and the health history of the user;
comparing the predicted second level of engagement of the user for the second type of content for the second time period with the engagement-threshold profile for the user; and outputting a signal indicating a result of the comparison between the predicted second level of engagement of the user for the second type of content for the second time period and the engagement-threshold profile for the user.

8. The method of claim 7, further including:
receiving biological function reference data of the user prior to the first time period.

9. The method of claim 8 wherein the step of predicting the second level of engagement of the user for the second type of content in the audio/video program to be displayed the second time period includes:
predicting the second level of engagement of the user for the second type of content in the audio/video program to be displayed during the second time period based on the first level of engagement, the viewing pattern of the user, the health history of the user, and the biological function reference data.

10. The method of claim 7, further including:
receiving biological function reference data of a group of users prior to the first time period.

11. The method of claim 10 wherein the step of predicting the second level of engagement of the user for the second type of content in the audio/video program to be displayed for the second time period includes:
predicting the second level of engagement of the user for the second type of content in the audio/video program to be displayed during the second time period based on the first level of engagement, the viewing pattern of the user, the health history of the user and the biological function reference data of the group of users.

12. A system for measuring user engagement when a user is viewing an audio visual program comprising:
a biological function user data receiver;
a first memory coupled to the biological function user data receiver, the first memory stores biological function user data received via the biological function user data receiver;
an audio visual program controller configured to output audio visual program to a display, the audio visual program being received from a source of program data;
a second memory coupled to the audio visual program controller, the second memory stores the audio visual program to be output via the audio visual program controller; and
a processor coupled to the first memory, the second memory, and the audio visual program controller, the processor configured to:
output the audio visual program via the audio visual program controller;
receive, from a personal computing device an indication that the user is viewing the audio visual program;
in response to receiving the indication, send a query to the personal computing device to obtain a health history of the user and types of biological function data obtainable by the personal computing device;
receive, from the personal computing device, the health history of the user and the types of biological function data capturable by the personal computing device;
generate an engagement-threshold profile for the user based on the health history;
select at least one biological function type for the personal computing device to obtain based on the engagement-threshold profile;
instruct the personal computing device to capture the biological function data of the selected at least one biological function type;
access the biological function data of the selected at least one biological function type of the user obtained by the personal computing device during a first time period while the audio visual program is being output;
determine a first level of engagement of the user for a first type of content in the audio visual being output during the first time period based on the biological function data;
prior to a second time period that is after the first time period, predict a second level of engagement of the user for a second type of content in the audio visual program to be output during the second time period based on the first level of engagement and the health history of the user;
compare the predicted second level of engagement of the user for the second type of content for the second time period with the engagement-threshold profile for the user; and
output a signal indicating a result of the comparison between the predicted second level of engagement of the user for the second type of content for the second time period and the engagement-threshold profile for the user.

13. The system of claim 12 wherein the processor is further configured to predict the second level of engagement of the user for the second type of content in the audio visual program to be output during the second time period based on the first level of engagement the health history of the user and a reference.

14. The system of claim 13 wherein the reference value is generated for the user.

15. The system of claim 13 wherein the reference value is based on a group of users while group of users were viewing the audio visual program.

16. The system of claim 12, further including the personal computing device that is coupled to the user.

17. The system of claim 16 wherein the personal computing device includes:
a biological function sensor configured to sense biological functions of the user; and
a transmitter configured to transmit the biological function data to the biological function user data receiver.

* * * * *

UNITED STATES PATENT AND TRADEMARK OFFICE
CERTIFICATE OF CORRECTION

Page 1 of 2

PATENT NO. : 11,750,883 B2
APPLICATION NO. : 17/213788
DATED : September 5, 2023
INVENTOR(S) : Vivek Devaraj et al.

It is certified that error appears in the above-identified patent and that said Letters Patent is hereby corrected as shown below:

In the Claims

Column 20, Claim 1, Line 34:
"the viewing-pattern of" should read: --the viewing pattern of--.

Column 20, Claim 1, Line 36:
"selecting, at least one" should read: --selecting at least one--.

Column 20, Claim 1, Line 52:
"user fora" should read: --user for a--.

Column 20, Claim 1, Line 53:
"in the data received" should read: --in the audio/video program being output during the first time period based on the biological function data received--.

Column 21, Claim 3, Line 10:
"program data from the" should read: --program from the--.

Column 21, Claim 6, Line 55:
"display;" should read: --display:--.

Column 21, Claim 6, Line 56:
"receiving from the" should read: --receiving, from the--.

Column 21, Claim 6, Line 61:
"of the audio/visual program;" should read: --of the audio/video program;--.

Column 23, Claim 11, Line 30:
"of the user and the" should read: --of the user, and the--.

Signed and Sealed this
Second Day of July, 2024

Katherine Kelly Vidal
*Director of the United States Patent and Trademark Office*

CERTIFICATE OF CORRECTION (continued)
U.S. Pat. No. 11,750,883 B2

Column 23, Claim 12, Line 51:
"computing device an" should read: --computing device, an--.

Column 24, Claim 12, Line 19:
"audio visual being" should read: --audio visual program being.--.